United States Patent [19]
Tackett

[11] Patent Number: 5,655,569
[45] Date of Patent: Aug. 12, 1997

[54] GAS CHARGED BLADDER FOR LOW PRESSURE ACCUMULATOR FOR VEHICULAR ANTI-LOCK BRAKING SYSTEM

[75] Inventor: Wendell Dean Tackett, Ann Arbor, Mich.

[73] Assignee: Kelsey-Hayes Company, Livonia, Mich.

[21] Appl. No.: 391,220

[22] Filed: Feb. 21, 1995

[51] Int. Cl.$^6$ .................................... F16L 55/04
[52] U.S. Cl. .............................. 138/30; 200/721
[58] Field of Search .................... 138/30, 26; 220/721; 303/113.2–113.4, 115.4

[56] References Cited

U.S. PATENT DOCUMENTS

| | | | |
|---|---|---|---|
| 1,950,107 | 3/1934 | Guinn et al. | 138/30 |
| 2,604,118 | 7/1952 | Greer | 138/30 |
| 2,757,689 | 8/1956 | Knox | 138/30 |
| 3,674,053 | 7/1972 | Murman et al. | 138/30 |
| 3,757,825 | 9/1973 | Givens et al. . | |
| 3,853,147 | 12/1974 | Cibulka | 138/30 |
| 3,868,972 | 3/1975 | Zirps | 138/30 |
| 4,162,692 | 7/1979 | Greer et al. | 138/30 |
| 4,291,726 | 9/1981 | Zahid | 138/30 |
| 4,305,428 | 12/1981 | Burton | 138/30 |
| 4,407,330 | 10/1983 | Fujiwara | 138/30 |
| 4,453,782 | 6/1984 | Arikawa et al. . | |
| 4,474,215 | 10/1984 | Richter et al. | 138/30 |
| 4,571,009 | 2/1986 | Jones . | |
| 4,828,335 | 5/1989 | Fuller et al. . | |
| 4,852,615 | 8/1989 | Stil | 138/30 |
| 5,027,859 | 7/1991 | Sugimura | 138/30 |
| 5,062,455 | 11/1991 | Schurter et al. | 138/30 |
| 5,066,075 | 11/1991 | Kaneda et al. . | |
| 5,094,433 | 3/1992 | Dan et al. | 138/30 X |
| 5,096,400 | 3/1992 | Budecker et al. . | |
| 5,143,428 | 9/1992 | Toda et al. . | |
| 5,209,554 | 5/1993 | Beilfuss et al. . | |
| 5,232,273 | 8/1993 | Eckstein et al. . | |
| 5,244,262 | 9/1993 | Kehl et al. . | |
| 5,271,667 | 12/1993 | Takata et al. . | |
| 5,427,152 | 6/1995 | Weber | 138/30 |

FOREIGN PATENT DOCUMENTS

| | | |
|---|---|---|
| 0491159A1 | 11/1991 | European Pat. Off. . |
| 1373140 | 12/1964 | France . |
| 1963709 | 7/1971 | Germany . |
| 4029846 | 4/1991 | Germany . |
| 4002635 | 8/1991 | Germany . |
| 4128386 | 3/1993 | Germany . |
| 1106759 | 4/1989 | Japan . |

*Primary Examiner*—Patrick Brinson
*Attorney, Agent, or Firm*—MacMillan, Sobanski & Todd

[57] ABSTRACT

A piston-less low pressure accumulator employs a gas-charged elastomeric bladder contained within a bore of a hydraulic control unit. Preferably, the low pressure accumulator contains a perforated metal member which limits compression of the bladder by hydraulic fluid beyond a fixed distance. The gas-charged low pressure accumulator may be manufactured with low parts count which encourages ease of assembly while providing freedom from sticking which may occur in piston-type accumulators.

6 Claims, 2 Drawing Sheets

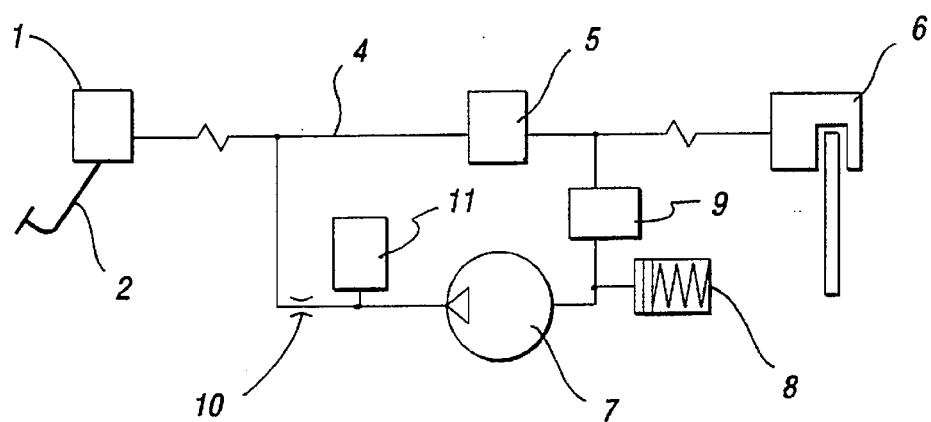
Fig. 1 (PRIOR ART)
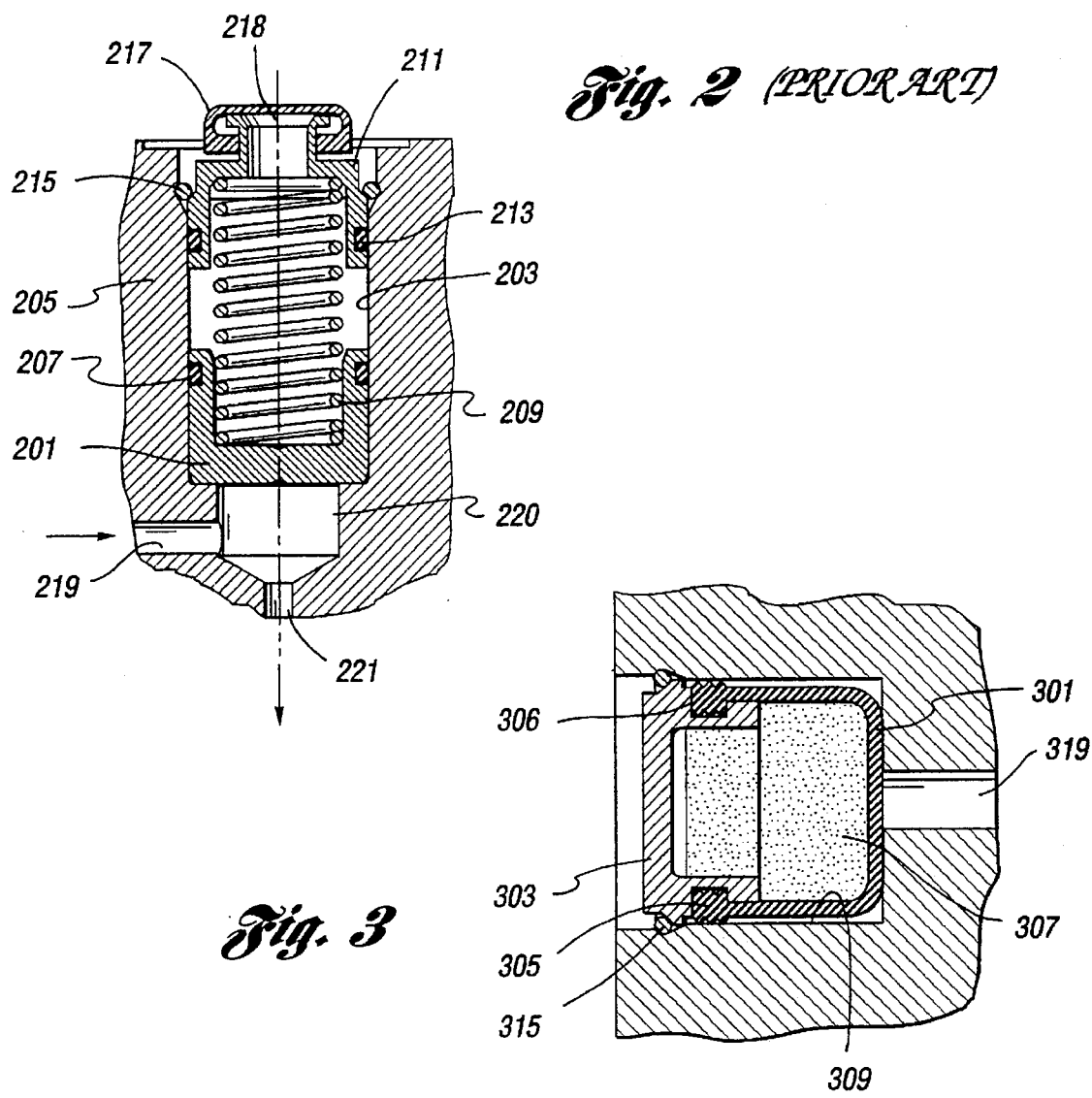
Fig. 2 (PRIOR ART)
Fig. 3

GAS CHARGED BLADDER FOR LOW PRESSURE ACCUMULATOR FOR VEHICULAR ANTI-LOCK BRAKING SYSTEM

TECHNICAL FIELD

The present invention pertains to hydraulic vehicle control systems such as anti-lock braking systems (ABS). More particularly, the subject invention pertains to a low pressure accumulator comprising a gas charged bladder useful in hydraulic vehicle control systems.

BACKGROUND ART

Anti-lock braking systems have now progressed to the point where they are standard on many vehicles. The use of integrated traction control systems is also now becoming increasingly widespread, and it is anticipated that their use will parallel that of anti-lock braking systems. These may be further integrated in other vehicle systems, i.e. power steering suspension or other ride control systems. In both braking systems rapid deployment of brake calipers or brake shoes are necessary in order to perform the intended control function. In anti-lock braking systems, when locking of the wheels due to over-application of brake pressure or loss of traction due to the nature of the surface, i.e., gravel, ice, or snow, is encountered, the automotive braking system rapidly pulsates the brakes between an off and an on condition, allowing maximal retention of braking ability while yet retaining the ability to steer the vehicle in a stable fashion. In traction control systems, loss of traction in a driving wheel is countered by a momentary application of brake pressure, thus restoring traction. In either case, high pressure hydraulic systems are desirable to affect the rapid changes necessary to achieve the desired control.

While some systems rely on the pressure generated by the brake master cylinder to achieve the desired results, response time in such systems is marginal, and thus, optimum response is not achieved. To overcome these drawbacks, high pressure pumps, eccentrically driven by an electric motor, supply the high pressure needed to actuate the system. Driving the high pressure pump at all times would be wasteful of energy and further create unwanted noise. Thus, the motor-driven high pressure pump is actuated only when the need for high pressure is sensed by the circuitry associated with anti-lock braking system or traction control system, as the case may be.

A typical anti-lock braking system is shown schematically in FIG. 1. Hydraulic fluid from the brake pedal 2 actuated master cylinder 1 flows through line 4 through normally open isolation solenoid valve 5 to brake caliper slave cylinder 6. Except for the presence of the additional normally open isolation valve, the system thus far described is similar to the normal braking system of the automobile. In an anti-lock brake system, detection of a lock condition actuates high pressure pump 7 and closes isolation solenoid valve 5. At the same time, hold/dump valve 9 is opened, allowing pressure to bleed from the brake cylinder to the low pressure accumulator 8. The brakes are thus momentarily released. To reapply the brakes, pressure from high pressure pump 7 is diverted to the brake cylinder by opening the isolation solenoid valve and closing the hold/dump valve, once again restoring braking pressure. This cycle repeats itself rapidly, resulting in rapid pulsations of on and off conditions, thus achieving maximal braking while avoiding a locked condition. During the dump cycle, and also during the period of time when the high pressure pump is outputting excess high pressure fluid, fluid flows into the low pressure accumulator. In order to minimize vibrations and to lessen the potential for damage to the system caused by them, it has proven useful to place an attenuator 11 on the outlet side of the pump between the pump outlet and master cylinder. The attenuator generally includes within its housing, a reduced diameter orifice 10, which, in combination with a compressible substance within the attenuator, markedly reduces pressure fluctuations and vibration felt at the pedal.

As the brakes are released during an ABS or other vehicle control cycle, pressurized fluid from the brake slave cylinders must flow from the slave cylinders to another portion of the system. While this flow could be directed to the master cylinder, by doing so, the master cylinder would be subject to considerable pressure fluctuations and vibration, which would then be felt by the vehicle operator. Thus, it is common to isolate the master cylinder at such times by allowing fluid to flow into the low pressure accumulator 8. With the accumulator normally selected, fluid flowing into the accumulator displaces a piston against a return spring located in the accumulator body. The tension of the spring is selected to provide a return force which is less than the brake-apply force at the slave cylinder. An outlet from the accumulator supplies fluid to the inlet of high pressure pump 7.

Typical low pressure accumulators utilize several seals, sleeves and other components, all of which must be hand-assembled. In addition, the dynamically sealed piston, in general, bears against a light alloy body. Wear of the body or the incidental occurrence of particulates may give rise to sticking of the piston and intermittent or total failure of the device. To minimize wear, a hard, heat-treated aluminum alloy must be used for the hydraulic control unit (HCU) body.

The fluid pressure within the brake line as stored by the low pressure accumulator is generally within 10 to 50 psig, as compared to brake apply pressures ranging from 0 to 3,000 psi.

SUMMARY OF THE INVENTION

The subject invention pertains to a pistonless low pressure accumulator which employs a gas-filled elastomeric bladder as the pressurizing element, located in a bore in the HCU body. The ability to utilize an elastomeric bladder minimizes part count and provides an accumulator which displays minimal hysteresis and an excellent working volume to total volume ratio.

It is an object of the subject invention to minimize the part count in low pressure accumulators.

It is a further object of the subject invention to eliminate the potential for sticking of the piston in low pressure accumulators.

It is still a further object of the subject invention to eliminate the potential for abrasion relative to the HCU body by accumulator components, and thus allow for use of a softer HCU body alloy.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 illustrates a schematic of an anti-lock braking system showing typical component relationships as known to be prior art;

FIG. 2 illustrates a low pressure accumulator of the prior art;

FIG. 3 illustrates one embodiment of a low pressure accumulator of the subject invention.

DESCRIPTION OF THE PREFERRED EMBODIMENTS

Figure 4A:
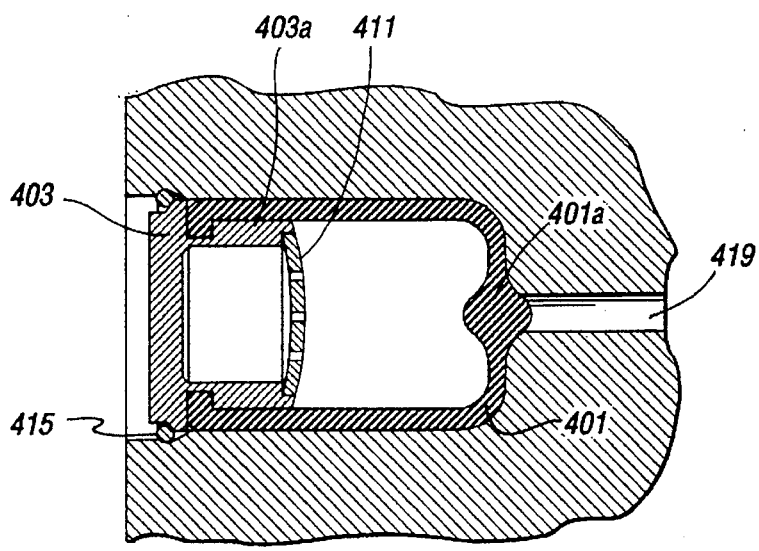
FIGS. 4a–4c illustrate additional embodiments of low pressure accumulators of the subject invention.

The low pressure accumulators of the subject invention comprise an elastomeric, gas-filled bladder contained in a bore in the HCU body of the vehicle control system, and most preferably contain a single inlet/outlet passage. More particularly, the low pressure accumulators of the subject invention comprise a bore contained in a hydraulic control unit body and at least one inlet/outlet passage communicating with said bore; an elastomeric bladder having a gas-filled interior maintained within said bore, the exterior of said bladder in contact with hydraulic fluid; and closure means effective to seal said bore. The bore has a length, and it has a first diameter and a step of larger diameter than the first diameter. The step of larger diameter is located closest to the exterior surface of the hydraulic control unit. The bladder has a closed end and open end, the open end sealingly engaging the closure means. The bladder extends through the bore, its length being such that the closed end of the bladder is disposed proximate the inlet outlet/passage.

FIG. 2 illustrates an accumulator of the prior art. Movable piston 201 is sealed to bore 203 of the HCU body 205 by elastomeric dynamic, 0-ring seal 207. Return spring 209 is located within a bore in piston 201, the other end of the return spring bearing against spring retainer sleeve 211, sealed against the light alloy housing by O-ring 213. At 218 is a vent covered by resilient rubber cover 217 which will allow air in and out of the accumulator as determined by the reciprocation of piston 201. The accumulator is retained in the HCU by a snap ring 215 as shown in U.S. Pat. No. 5,364,067 assigned to the assignee of the present invention, and incorporated herein by reference. Pressurized fluid from the brake slave cylinder via the hold/dump valve enters the accumulator through inlet line 219 to inlet/outlet port 220, driving piston 201 inward against the pressure of return spring 209. With the hold/dump valve closed, pressurized fluid stored in the accumulator is supplied to the high pressure pump inlet through inlet/outlet port 220 to outlet line 221.

In FIG. 3 is illustrated one embodiment of the gas-filled low pressure accumulator of the subject invention, which comprises but two parts. Elastomeric bladder 301 is sealed against closure 303 by the end portion thereof which includes a radially inwardly extending annular retention rib 305. The rib 305 is preferably molded to contain multiple, annular sealing ribs extending about the inner and outer circumference of the retention rib 305. Preferably, the sealing ribs are directly opposed to each other or concentric with each other. The sealing ribs around the outer circumference of the bladder seal against the HCU body, while those on the inner portion seal against the closure within an annular retention groove 306. Chamber 307 including the annular cavity of closure 303 is filled with pressurized gas during assembly. Closure 303 is maintained in bore 309 by snap ring 315 retained within the HCU alloy body in the same manner as described above.

During operation, pressurized fluid from the brake slave cylinder via the open hold/dump valve enters inlet/outlet 319 and forces elastomeric bladder 301 inward on chamber 307 against the pressure of gas enclosed by the bladder. Upon closure of the hold/dump valve, fluid stored in the accumulator is forced out of inlet/outlet 309 by the internal pressure of gas in chamber 307.

In FIG. 4a is illustrated a further embodiment of the subject invention. The numerals in FIG. 4a are analogous to those in FIG. 3. In FIG. 4a, however, an annular internal perforated plate 411 is attached to the closure 403 and spaced apart from the closure by the projecting cylindrical extension 403a of the closure. The perforated plate, which is slightly convex, bowing outward in the direction of the bladder limits the maximum displacement of elastomeric bladder 401 should normal deformation be exceeded by an unexpected increase in line pressure. The elastomeric bladder 401 has a thickened cross-section 401a exceeding the diameter of inlet/outlet 419 to prevent extrusion of the bladder into the inlet/outlet 419.

Figure 4B:
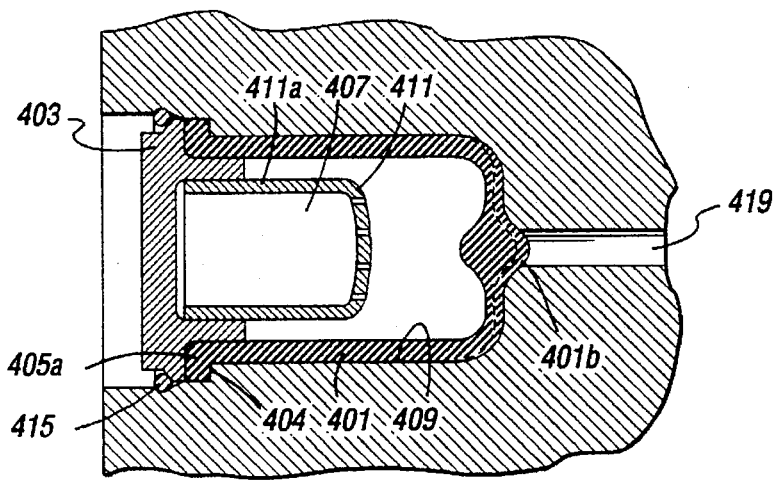
Figure 4C:
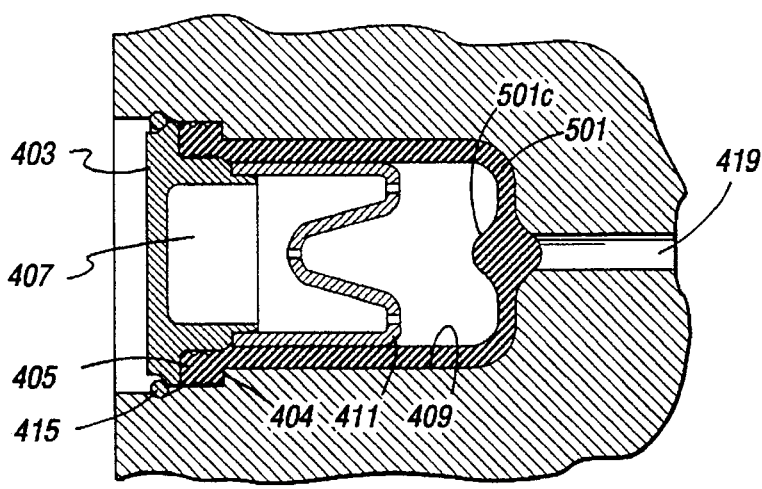

Alternative arrangements of the perforated plate are shown in FIGS. 4b–4c. In FIG. 4b, the outermost surface of the elastomeric bladder 401b (the surface nearest the inlet/outlet) is shown to have a transverse groove molded in to prevent any fluid from being trapped by the bladder against the bore of the accumulator. This groove may advantageously extend up the longitudinal wall of the bladder as well. More than one groove may be provided. Conversely, the opposing surface of the housing at the inlet/outlet port 419 may include the groove. In addition, FIG. 4b illustrates an alternative method of sealing the bladder against both leakage of gas charge and hydraulic fluid by capturing sealing flange 405a between closure 403 and a step 404 in bore 409, and a further means for spacing the perforated plate apart from the closure, this spacing means comprising the elongated cylindrical portion 411a of perforated plate member 411. The perforated plate 411 is preferably in the shape of a cylinder, the open end of which is fixed to the closure, for example by a press fit, the closed end of which is perforated and projects partially toward the closed end of the bladder 401.

In FIG. 4c, the shape of the perforated plate 411 is dished inwardly toward closure cavity 407 to coincide with the anticipated shape of the interior of the end of the bladder 401c under pressure to avoid crinkling of the bladder when fully displaced.

The diameter of the low pressure accumulator and its length are not overly critical, and may be selected with regard to the designed volume of fluid desired to be stored by the accumulator during operation. A typical fluid volume may range from 1cm$^3$ to about 10cm$^3$, preferably from 1cm$^3$ to 6 cm$^3$, with nominal values of c.a. 3 cm$^3$. For these accumulator fluid volumes, the volume of gas enclosed by the bladder will range from 6–15 cm$^3$, with a preferred volume of between 8–11 cm$^3$. Typical accumulator dimensions to provide such volumes are between 15 and 25 mm diameter, preferably about 19 mm, and a length of from 30–50 mm, preferably 35–48 mm. An advantage of the subject low pressure accumulators is that their length may be shortened and the device made more "squat" since piston travel and piston length are disposed with as is the generally somewhat long return spring. The depth of the HCU may be reduced accordingly.

The closure of the low pressure accumulator may be a threaded closure sealed by a conical shoulder bearing against the HCU body, a snap-ring retained closure bearing a circumferential groove containing a sealing O-ring, or preferably, a simple stepped cylindrical member having an outermost end of enlarged diameter which fits within a step in the bore of the accumulator and is formed as previously described.

The bladder itself in all embodiments is an elastomeric material, preferably in the form of a cylinder having a closed end and an open end, the diameter of the cylinder, when installed in the bore, preferably closely matching the bore diameter. The bladder may be a smaller diameter than the bore as well, thus providing a slight clearance with the HCU. However, maintaining this clearance to a minimum is preferred as this limits the space to be filled by hydraulic fluid and eliminates the need for bleeding air from the system at this point. The elastomeric material of which the bladder is made is not overly critical, but should be resistant to hydraulic fluid, relatively gas impermeable, and operable within a temperature range of $-40°$ C. to $+120°$ C. Such materials are well known to designers of hydraulic components. Suitable, for example, are butyl rubber, silicone rubber, and EPDM (ethylene, propylene diene monomer).

The bladder should have a thickness sufficient to prevent failure even over long periods of use. A thickness of from 1 mm to 5 mm, preferably about 3 mm is preferable. In order that the pressure of gas within the bladder not cause the bladder to extrude into the inlet/outlet bore(s), it may be advantageous to increase the thickness of the bladder at such locations as shown in FIGS. 4a–4c. It may further be appropriate to radius or otherwise smooth out the point of entry of the inlet/outlet bore(s) to further prevent bladder extrusion.

Air is the preferred gas for filling the bladder since the required precharge (pressurization of the bladder internally after assembly to the closure) is very low, i.e., on the order of 20 psig. Nitrogen gas is also desirable as is well known for use in gas charged accumulators as preventing oxidation of the elastomer. The manner of precharge could include any one of several techniques including tapping the closure 303/403 in the case of the embodiments of FIGS. 4b and 4c, or pressurizing the bladder interior during assembly.

The internal pressure during normal operation should range from approximately 10 psig to 50 psig assuming a 3 $cm^3$ accumulator fluid volume. It is assumed that even with low permeability elastomers, some loss of pressure will occur over the working life of the accumulator. The total loss over ten years is estimated to be approximately 10%. The pressure will also change over the working temperature range of $-40°$ to $120°$ C. and will be subject to an estimated ±5% variation during charging. The preferred precharge pressure at 20° C. is in the range of 15–30 psig, preferably about 20 psig, again assuming an accumulator fluid volume of approximately 3 $cm^3$ and a gas volume of approximately 11 $cm^3$.

Having now fully described the invention, it will be apparent to one of ordinary skill in the art that many changes and modifications can be made thereto without departing from the spirit or scope of the invention as set forth herein.

For example, yet another alternative embodiment (not shown), the bladder may be manufactured as a completely closed cylinder having a determined internal pressure which is compressed as it is inserted into the accumulator cavity. The enclosed cylinder may have an extension at the top toward the closure with a radially extending projecting ring which snaps into a corresponding annular groove in the closure. In these as well as other embodiments, the gas filling of the bladder may be augmented by the presence of other compressible filling material, such as an open-celled or closed-celled elastomeric foam. Such an augmenting filler may itself supply the internal pressure of the bladder, or may only partially fill the bladder, thus providing a further means for limiting compression of the bladder by pressure of hydraulic fluid in the event of a failure of a hold/dump valve.

What is claimed is:

1. In a hydraulic control unit, a pistonless fluid pressure accumulator suitable for use in a vehicle control system, comprising:

a bore contained in the hydraulic control unit body and at least one inlet/outlet passage communicating with said bore;

an elastomeric bladder having a gas-filled interior maintained within said bore, an exterior of said bladder in contact with hydraulic fluid, said bladder, when not being compressed, substantially filling said bore, said bladder further having a radially outwardly extending annular retention rib molded to contain multiple, annular sealing ribs extending about the inner and outer circumference of the retention rib, and said bore is stepped to receive said radially outwardly extending annular retention rib to seal said bladder to said bore, preventing leakage of hydraulic fluid past said seal; and removable closure means, including a metal closure having no apertures extending therethrough, effective to seal said bore.

2. In a hydraulic control unit, a pistonless fluid pressure accumulator suitable for use in a vehicle control system, comprising:

a bore contained in the hydraulic control unit body and at least one inlet/outlet passage communicating with said bore;

an elastomeric bladder having a gas-filled interior maintained within said bore, the exterior of said bladder in contact with hydraulic fluid, said bladder, when not being compressed, substantially filling said bore, said bladder further having a radially inwardly extending annular retention rib molded to contain multiple, annular sealing ribs extending about the inner and outer circumference of the retention rib; and removable closure means, including a metal closure having no apertures extending therethrough, effective to seal said bore, said metal closure having an annular slot to receive said radially inwardly extending annular retention rib to seal said bladder to said metal closure and to said bore, preventing leakage of hydraulic fluid past said seal.

3. A low pressure accumulator suitable for use in a vehicle control system and disposed within a light alloy hydraulic control unit having a stepped bore, said bore having a length, and having a first diameter and a step of larger diameter than said first diameter, said step of larger diameter located closest to the exterior surface of said hydraulic control unit, and an inlet/outlet passage communicating with said bore of said first diameter, said accumulator comprising:

a cylindrical closure member having at least a first portion having a diameter less than the first diameter of the housing bore and a second portion having a second diameter greater than the first diameter of the housing bore, said second diameter providing a sliding fit within the bore, the cylindrical closure member having no apertures extending therethrough; and a gas-filled, generally cylindrical elastomeric bladder having a closed end and an open end, the length of said bladder being such as to position an exterior of said closed end proximate said inlet/outlet passage, the open end of said bladder having a radially inwardly extending annular retention rib, said cylindrical closure member having an annular slot to receive said radially inwardly extending annular retention rib to seal said bladder to said cylindrical closure member, said bladder, when not being compressed, substantially filling said bore, said bladder further having a radially outwardly extending annular retention rib molded to contain multiple, annular sealing ribs extending about the inner and outer circumference of the retention rib, and said bore being stepped to receive said radially outwardly extending annular retention rib to seal said bladder to said bore.

4. A low pressure accumulator suitable for use in a vehicle control system and disposed within a light alloy hydraulic control unit having a stepped bore, said bore having a length, and having a first diameter and a step of larger diameter than said first diameter, said step of larger diameter located closest to the exterior surface of said hydraulic control unit, and an inlet/outlet passage communicating with said bore of said first diameter, said accumulator comprising:

a cylindrical closure member having at least a first portion having a diameter less than the first diameter of the housing bore and a second portion having a second diameter greater than the first diameter of the housing bore, said second diameter providing a sliding fit within the bore, the cylindrical closure member having no apertures extending therethrough; and a gas-filled, generally cylindrical elastomeric bladder having a closed end and an open end, the length of said bladder being such as to position an exterior of said closed end proximate said inlet/outlet passage, the open end of said bladder having a radially inwardly extending annular retention rib, said cylindrical closure member having an annular slot to receive said radially inwardly extending annular retention rib to seal said bladder to said cylindrical closure member, said bladder, when not being compressed, substantially filling said bore, said bladder further having a radially inwardly extending annular retention rib molded to contain multiple, annular sealing ribs extending about the inner and outer circumference of the retention rib, and said cylindrical closure member having an annular slot to receive said radially inwardly extending annular retention rib to seal said bladder to said cylindrical closure member and to said bore.

5. In a hydraulic control unit, a piston-less fluid pressure accumulator suitable for use in a vehicle control system, comprising:

a bore contained in the hydraulic control unit body and at least one inlet/outlet passage communicating with said bore;

a removable closure member effective to seal said bore;

an elastomeric bladder having a gas-filled interior maintained within said bore, an exterior of said bladder being in contact with hydraulic fluid, said bladder, when not being compressed, substantially filling said bore, said bladder having a generally cylindrical shape, an open end of said cylindrical shape of said bladder sealed against said closure member, a closed end of said cylindrical shape of said bladder proximate said inlet/outlet passage, said closed end of said bladder being molded to contain a section of greater thickness than the remainder of said closed end, the area of greatest thickness corresponding substantially with the axis of said inlet/outlet passage, and at least the surface of the bladder proximate the closed end thereof having at least one lateral groove therein; and a perforated metallic collapse limiting member located within the interior of said bladder and spaced apart from said closure member, wherein the limiting member is a generally cylindrical member having an open end bearing against said closure member and a perforated end, the length of said cylinder being substantially less than that of said bladder.

6. A low pressure accumulator suitable for use in a vehicle control system and disposed within alight alloy hydraulic control unit having a stepped bore, said bore having a length, and having a first diameter and a step of larger diameter than said first diameter, said step of larger diameter located closest to the exterior surface of said hydraulic control unit, and an inlet/outlet passage communicating with said bore of said first diameter, said accumulator comprising:

a cylindrical closure member having at least a first portion having a diameter less than the first diameter of the housing bore and a second portion having a second diameter greater than the first diameter of the housing bore, said second diameter providing a sliding fit within the bore, the cylindrical closure member having no apertures extending therethrough; and a gas-filled, generally cylindrical elastomeric bladder having a closed end and an open end, the length of said bladder being such as to position an exterior of said closed end proximate said inlet/outlet passage, the open end of said bladder having a radially inwardly extending annular retention rib, said cylindrical closure member having an annular slot to receive said radially inwardly extending annular retention rib to seal said bladder to said cylindrical closure member, said bladder, when not being compressed, substantially filling said bore, and at least the surface of the bladder proximate the closed end thereof having at least one lateral groove therein.

* * * * *